Patented Oct. 13, 1953

2,655,521

UNITED STATES PATENT OFFICE 2,655,521

PRODUCTION OF HALOGENO FATTY ACID ESTERS

Elbert C. Ladd, Passaic, N. J., and Herbert Sargent, San Anselmo, Calif., assignors to United States Rubber Company, New York, N. Y., a corporation of New Jersey No Drawing. Application October 6, 1950, Serial No. 188,872

1 Claim. (Cl. 260—408)

This invention relates to a novel method for the synthesis of certain halogeno fatty acid esters.

More particularly, the invention relates to the discovery that certain esters of certain polyhalogeno fatty acids containing halogen in the alpha position and halogen in at least one other position can be selectively hydrogenated so as to replace by hydrogen the halogen in the alpha position only.

The invention relates to hydrogenation of fatty esters of the type

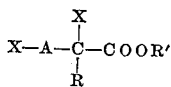

which produces esters of the type

X—A—CHR—COOR' where X represents chlorine or bromine; A is alkenylene; R represents X, hydrogen, alkyl, or haloalkyl; and R' is lower alkyl. Examples of such alkyl and haloalkyl radicals are methyl, ethyl, propyl, butyl, amyl, hexyl, heptyl, octyl, nonyl, decyl, undecyl, dodecyl, tridecyl, tetradecyl, hexadecyl, octadecyl, chloromethyl, beta-chloroethyl, beta-chloropropyl, beta-chlorobutyl, beta-chloroamyl, beta-chlorohexyl, beta-chloroheptyl, beta-chlorooctyl, beta-chlorononyl, beta-chlorodecyl, beta-chloroundecyl, beta-chlorododecyl, beta-chlorotridecyl, beta-chlorotetradecyl, beta-chlorohexadecyl, beta-chloroheptadecyl, beta-chlorooctadecyl, beta-bromoethyl, beta-bromopropyl, beta-bromobutyl, beta-bromoamyl, beta-bromohexyl, beta-bromoheptyl, beta-bromooctyl, beta-bromononyl, beta-bromodecyl, beta-bromoundecyl, beta-bromododecyl, beta-bromotridecyl, beta-bromotetradecyl, beta-bromohexadecyl, beta-bromoheptadecyl, beta-bromooctadecyl, gamma-chlorobutyl, gamma-bromobutyl, etc.

Examples of the invention include the following:

Starting material:
$ClCH_2CH_2CCl_2COOC_2H_5$
$CH_3CHClCH_2CCl_2COOC_2H_5$
$CH_2BrCH_2CBr(CH_3)COOC_2H_5$
$CH_3CH_2CCl_2COOC_2H_5$
$(ClCH_2CH_2)_2CClCOOC_2H_5$
$CH_2BrCH_2CCl(CH_3)COOC_2H_5$
$CH_2ClCHBrCH_2CHBrCOOC_2H_5$
$CH_3CHClCCl(COOC_2H_5)CH_2CHCl(CH_2)_6H$ Product:
$ClCH_2CH_2CHClCOOC_2H_5$
$CH_3CHClCH_2CHClCOOC_2H_5$
$CH_2BrCH_2CH(CH_3)COOC_2H_5$
$CH_3CH_2CHClCOOC_2H_5$
$(ClCH_2CH_2)_2CHCOOC_2H_5$
$CH_2BrCH_2CH(CH_3)COOC_2H_5$
$CH_2ClCHBrCH_2CH_2COOC_2H_5$
$CH_3CHClCH(COOC_2H_5)_2CH_2CHCl(CH_2)_6H$ The products are useful as plasticizers, and as intermediates for the preparation of certain amino acids, such as lysine and as intermediates for the preparation of certain lactones, e. g., gamma-undecalactone (the so-called "peach aldehyde") useful as perfumes or perfume bases.

The following examples illustrate the invention in more detail.

Example I $CH_2BrCH_2CHClCOOC_2H_5 \xrightarrow{H_2} CH_2BrCH_2CH_2COOC_2H_5$ A starting material, ethyl alpha-chloro-gamma-bromobutyrate, is prepared by reacting ethyl bromochloroacetate with ethylene in the presence of a free-radical type reaction initiator, e. g., an acyl peroxide such as benzoyl peroxide. Ethyl alpha-chloro-gamma-bromobutyrate (22.95 g.) is added to 35 ml. of ethyl alcohol, the latter containing 0.15 gm. of pre-reduced platinum oxide and also containing 0.12 mole of ammonia. The mixture is enclosed in a vessel connected to a source of hydrogen at atmospheric pressure and about 25° C. The vessel is vigorously agitated during the absorption of hydrogen. At the end of 1⅓ hours 2500 ml. of H₂ have been absorbed and absorption has ceased. The reaction mixture is diluted with about three volumes of water and extracted with petroleum ether. The extract is dried over sodium sulfate and then subjected to fractional distillation to yield 11 gms. of ethyl gamma-bromobutyrate having a boiling point of 73–74.5° C./7 mm.

Percent bromine found, 43.67%; Theory, 41.0%.

Example II

To a solution of 2.0 gms. of potassium cyanide in absolute ethanol are added 1.9 gms. of the product of Example I. The mixture is heated on a steam bath, whereupon the precipitation of inorganic salt is soon apparent. After being heated for four hours the mixture is diluted with water and extracted twice with a solvent consisting of two parts of ethyl alcohol and one part of petroleum ether. The extract is concentrated by heating, to produce a syrup which is considered to be ethyl gamma-cyanobutyrate. This syrup is heated on a steam bath with 20 ml. 12-N hydrochloric acid for 2¼ hours, then diluted with water and extracted twice with ether. The ether extract is dried over sodium sulfate and then concentrated by heating, to obtain a semi-crystalline residue. The semi-crystalline residue is crystallized three times from isopropyl alcohol to yield glutaric acid, M. P. 95–95.2° C. This example proves the overall sequence of reactions to be:

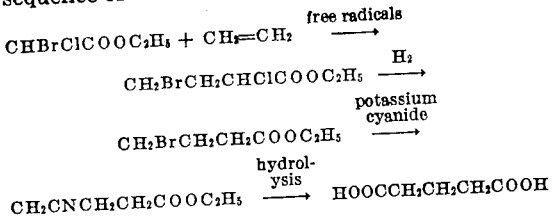

Example III (a) Ethyl alpha, alpha, gamma-trichlorobutyrate (prepared by reacting one mole of ethylene and one mole of ethyl trichloroacetate in the presence of free radicals) is reduced by dissolving 44 gms. thereof in 100 ml. ethanol and mixing therewith a suspension of approximately .3 gm. of prereduced platinum oxide in a small amount of ethanol and treating with hydrogen as in Example I. At the end of one hour the reaction is interrupted and 0.1 mole of ammonia in a little ethanol is added. The reaction is resumed and at the end of an additional 1⅓ hours the absorption of hydrogen virtually ceases, a total of 5240 ml. having been absorbed. The reaction mixture is diluted with water and extracted with petroleum ether and the extract dried over sodium sulfate.

(b) Experiment III(a) is repeated except for the following variations: 0.2 mole of ammonia is added at the start of the reaction. It is soon observed that hydrogen absorption is slow. Therefore, 12 ml. of glacial acetic acid are added and the reaction is resumed. At the end of one hour 4330 ml. of hydrogen have been absorbed and reaction has virtually ceased. The reaction mixture is diluted with water and extracted with petroleum ether and the extract dried over sodium sulfate.

The extracts from (a) and (b) are combined and fractionally distilled to yield 57 gms. of ethyl alpha, gamma-dichlorobutyrate, B. P., 72–73° C./3 mm.

Percent chlorine (Calc. for

CH₂ClCH₂CHClCOOC₂H₅)

38.34; percent chlorine found, 39.29.

Example IV

Ethyl 2,2,6-trichlorohexanoate (prepared by reacting one mole of ethyl trichloroacetate with two moles of ethylene in the presence of free radicals) is reduced by dissolving 74.3 gms. thereof in 90 ml. of absolute ethanol containing 0.3 mole of ammonia and 25 ml. of glacial acetic acid, adding .4 gm. of prereduced platinum oxide in 10 ml. ethanol, and treating with hydrogen as in Example I until 6000 ml. are absorbed. This requires about 1½ hours. The reaction mixture is then diluted with water, extracted with petroleum ether and the extract is dried over sodium sulfate. The extract is distilled to yield 56 gms. of ethyl alpha-omega-dichlorohexanoate having a B. P. of 102–104° C./3 mm.

Percent chlorine (theory), 33.45; percent chlorine found, 33.08.

Example V

Ethyl 2,2,4-trichlorodecanoate is reduced by dissolving 30.25 parts thereof in 48 parts of ethanol and admixing with it a suspension of approximately 0.3 part of platinum oxide in 7.8 parts of ethanol which has been previously treated with hydrogen until absorption ceases. The mixture is then enclosed in a vessel connected to a source of hydrogen at atmospheric pressure and about 25° C. At the end of 1 hour the reaction is interrupted while a solution of 0.51 part of ammonia in 6.2 parts of ethanol is added. The reaction is then resumed and at the end of an additional hour the absorption of hydrogen virtually ceases, a total of 0.122 part of hydrogen having been absorbed.

The reaction mixture is then diluted with 3 volumes of water and extracted with several portions of petroleum ether (a commercial mixture of aliphatic hydrocarbons comprising mostly pentane, hexane and heptane). The extract is dried and fractionally distilled to yield 19 parts of the new compound, ethyl 2,4-dichlorodecanoate, B. 118–120° C./2 mm. Upon treatment with alcoholic ammonia the ester is converted to the corresponding 2,4-dichlorodecanoamide, which melts at 95.5–96.0° C. after recrystallization from petroleum ether.

Example VI

Ethyl 2,4-dibromodecanoate (20 g.), a product obtained by reacting one mole of ethyl dibromoacetate with one mole of 1-octene in the presence of free radicals, is reduced by dissolving it in 40 ml. of absolute ethanol, adding thereto .3 gm. of prereduced platinum oxide in 30 ml. of absolute ethanol, and treating with hydrogen as in Example I until 1420 ml. are absorbed. The product is diluted with water, extracted with petroleum ether, and the extract is dried and fractionally distilled to yield 13 gms. of ethyl 4-bromodecanoate having a B. P. of 99–101° C./1 mm.

Example VII

Thirteen and five tenths gms. of ethyl 2,2-dichlorodecanoate (13.5 g.) is dissolved in 50 ml. of ethanol containing 1.3 gms. of prereduced platinum oxide. The mixture is then treated with hydrogen as in Example I until 1,300 ml. are absorbed. The reaction mixture is then diluted with water, extracted with petroleum ether. The ether extract is dried and fractionally distilled to yield 7 gms. of crude ethyl 2-chlorodecanoate boiling at 104–108° C./2 mm.

Having thus described our invention, what we claim and desire to protect by Letters Patent is:

A method of forming fatty esters of the formula (I)

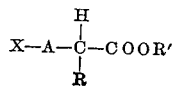

from fatty esters of the formula (II)

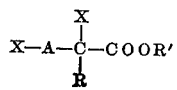

where X represents chlorine or bromine; A is alkylene; R represents X, hydrogen, alkyl or haloalkyl; and R' is lower alkyl, which comprises subjecting the esters of the Formula II to the action of hydrogen gas, in the presence of a hydrogenation catalyst, until the absorption of hydrogen gas has ceased, and subsequently recovering the ester of the Formula I.

ELBERT C. LADD.
HERBERT SARGENT.

References Cited in the file of this patent

UNITED STATES PATENTS

| Number | Name | Date |
|---|---|---|
| 2,515,306 | Ladd et al. | July 18, 1950 |